Figure 1:
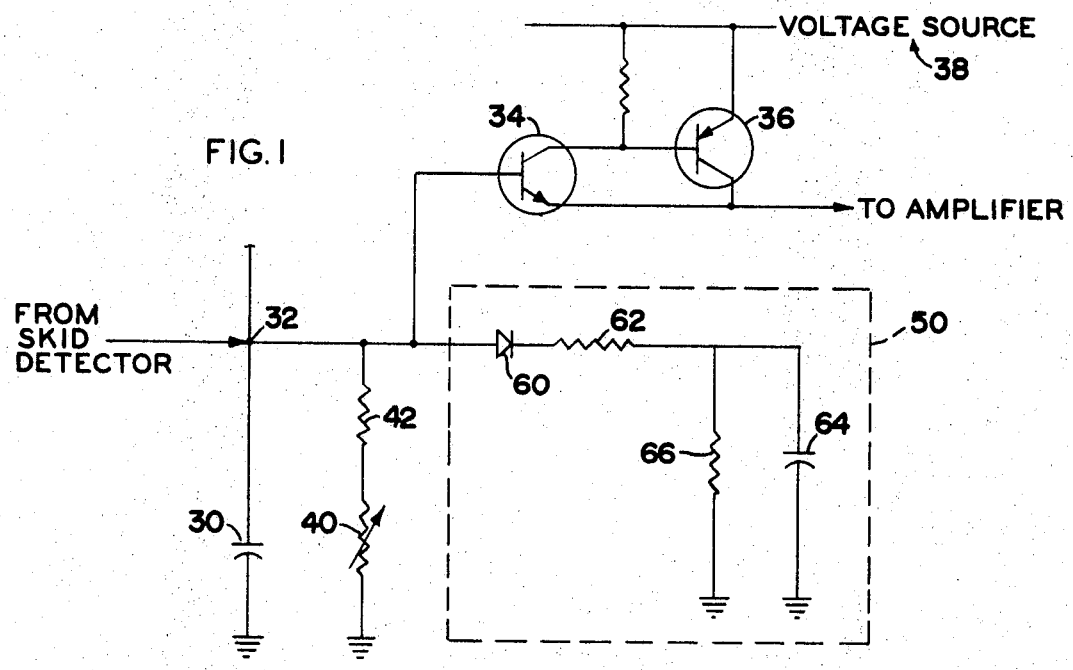

United States Patent

[11] 3,582,151

[72] Inventors: Edgar J. Ruof
Akron, Ohio;
Ervin G. Romero, Seattle, Wash.
[21] Appl. No. 731,118
[22] Filed May 22, 1968
[45] Patented June 1, 1971
[73] Assignee The Goodyear Tire & Rubber Company
Akron, Ohio

[54] ANTISKID MODULATOR CONTROL CIRCUIT
4 Claims, 2 Drawing Figs.
[52] U.S. Cl. .................................................. 303/21, 303/20
[51] Int. Cl. ................................................. B60t 8/08
[50] Field of Search .................................... 303/20, 21 A, A4, BE, BB, 22

[56] References Cited
UNITED STATES PATENTS
3,026,148  3/1962  Ruof ........................ 303/21(BE)
3,398,995  8/1968  Martin ....................... 303/21(A4)

Primary Examiner—Duane A. Reger
Attorneys—F. W. Brunner, Paul E. Milliken and Oldham and Oldham ABSTRACT: In large aircraft brakes, antiskid features are mandatory. Heretofore, it has been known to include a modulator system in the antiskid circuit to establish tire-runway coefficient frictions so that maximum braking pressure could be applied throughout the stop without causing a skid condition to occur. The invention incorporates a modification into a modulator circuit causing the modulator circuit to discharge more rapidly after the first antiskid cycle than it discharges throughout the remainder of the landing run so as to overcome misinformation to the circuit which occurs upon initial touchdown when the full weight of the airplane is not on the wheel. The circuit to accomplish this result incorporates a capacitor which is adapted to charge upon the first discharge of the loading capacitor in the modulator circuit, thereby in effect cancelling out the effect of the modulator circuit on the first skid.

INVENTORS
EDGAR J. RUOF
ERVIN G. ROMERO
BY Oldham & Oldham
ATTORNEYS.

3,582,151

ANTISKID MODULATOR CONTROL CIRCUIT

ANTISKID MODULATOR CONTROL CIRCUIT

This application is an improvement on pending U.S. Pat. application Ser. No. 593,150, entitled "Skid Control System," filed Nov. 9, 1966, and now abandoned.

The circuit of the instant invention was developed in an effort to counteract the vertical load buildup characteristics of larger airplanes just after touchdown. It was found that when a large airplane landed and the brakes were immediately applied, the antiskid system disclosed in the above-identified application immediately established the proper modulator voltage for conditions as they existed at that instant. Unfortunately, the vertical load on the landing gear was relatively low at that instant, which resulted in the apparent tire-runway coefficient of friction being relatively low. This, in turn, caused the antiskid system to establish a modulator voltage that was correct at that instant but too high shortly thereafter. In the few seconds after touchdown the vertical load increased faster than the modulator circuit could adapt to the increasing load. This resulted in brake pressure being held unnecessarily low during the first few seconds after touchdown which in turn resulted in landing runs that could have been shorter.

The instant invention provides a circuit adaptation to the modulator circuit of the above-identified application causing the modulator circuit to discharge more rapidly after the first antiskid cycle than it discharges throughout the remainder of the landing run. In this manner the aforesaid problem is solved.

Therefore, the general object of the invention is to provide an adapter for an antiskid modulator circuit which will establish the proper tire-runway coefficients of friction only after the vertical loading on the landing gears has stabilized upon craft landing.

The aforesaid objects of the invention and other objects which will apparent as the description proceeds are achieved by providing in an antiskid braking system the combination of a rotatable wheel, means to supply hydraulic-braking pressure to the wheel, valve means to adjustably restrict the hydraulic pressure actually applied to the wheel, means to represent wheel rotation as an electrical signal, skid detector means to control the braking pressure to the wheel by supplying a control signal to the valve means, a modulation circuit acting in accordance with the control signal to adjust the valve means to a hydraulic pressure slightly lower than that which caused the skid upon return braking operation after actuation of the valve means which is characterized by circuit means associated with the modulation circuit to allow the modulation circuit to respond more rapidly to the control signal during at least the first detection of the skid by the skid detector means so that true wheel landing conditions can be established before the modulation circuit begins to function at a normal predetermined rate.

Figure 2:
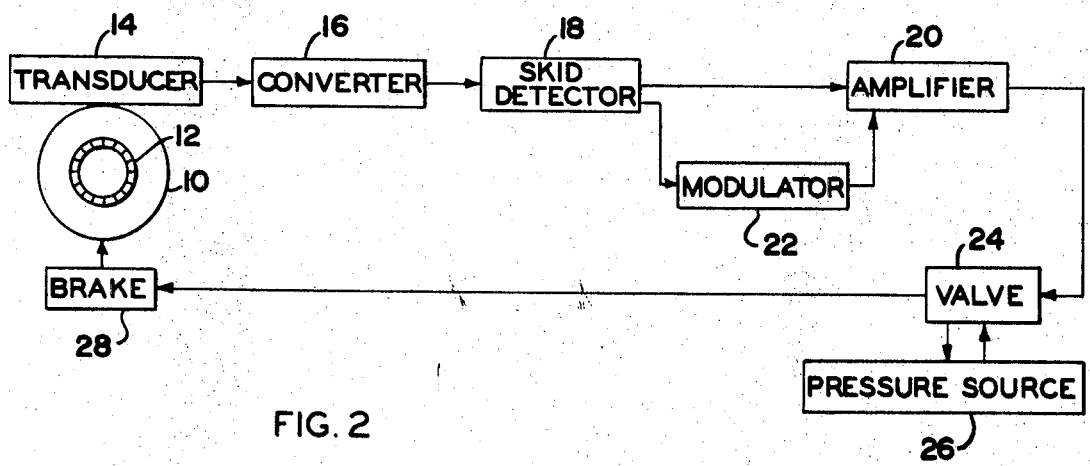

For a better understanding of the invention reference should be had to the accompanying drawings wherein:

FIG. 1 is a schematic electrical diagram illustrating the incorporation of the new circuit control in a modulator circuit; and FIG. 2 is a block diagram of the overall antiskid system showing the relationship of the modulator and modulator control circuit with respect to the overall system in block diagram form.

The block diagram of FIG. 2 illustrates a rotatable wheel 10 having an exciter ring 12 to actuate a transducer 14. Transducer 14 generates an alternating signal which is sent to a converter 16 for conversion to DC and then sent to a skid detector 18 which senses skid or approaching skid conditions of wheel 10. The output from the skid detector 18 can be sent directly to an amplifier 20 or selectively through a modulator 22 before going through amplifier 20. The purpose of the modulator 22 is to avoid the complete on-off relationship normally present in prior art skid detecting systems, and to always apply a braking pressure just short of that which will cause the skid so as to shorten the actual runway stopping distance. The actual circuit which might comprise a modulator 22 is shown in the above-identified patent application. The output from amplifier 20 is sent to a valve 24 which is connected to a pressure source 26. In effect, the signal from amplifier 20 to valve 24 controls the amount of brake pressure from source 26 which is passed to a brake 28 associated with wheel 10. During normal braking operations, without any skid conditions, maximum braking pressure will be sent through valve 24 to brake 28, but as soon as the skid detector senses the skid, pressure will be either restricted through valve 24 or dumped back to the pressure source, all in the conventional manner. Preferably, the valve 24 is not an on-off type, but it is instead a flapper-nozzle type which reduces outlet pressure from the inlet pressure by an amount that is proportional to the signal from amplifier 20. Normally, each brake in a multiwheel system will have its own valve 24.

The solution to the problem presented above is made by a minor modification to the modulator circuit 22. This modification causes the modulator circuit to discharge more rapidly after the first antiskid cycle than it discharges throughout the remainder of the landing run. The structure of the modulator circuit 22 is shown in FIG. 1 which comprises essentially a capacitor 30 which might be called the modulating capacitor since it controls the voltage at point 32 of the input signal from the skid detector 18. In essence, the voltage from capacitor 30 is what is applied to valve 24 between skids. However, since the current required by valve 24 is too great to be supplied directly by capacitor 30, transistors 34 and 36, respectively connected from a voltage source 38, are used to provide current amplification of the signal which is then further amplified in amplifier 20. Resistors 40 and 42 establish the discharge rate of capacitor 30, and therefore establish the rate of increase of brake pressure between skids. Note that the resistor 40 is adjustable. The voltage that exists on capacitor 30 after a skid establishes a level at which brake pressure will be reapplied after the skid. The setting of resistor 40 establishes the rate of discharge of capacitor 30.

The novel portion of the circuit is indicated by dotted block 50. When the first skid cycle occurs, the modulator capacitor 30 immediately becomes charged to the proper voltage for the apparent tire-runway coefficient of friction. Without the added circuit 50 the discharge rate of the modulator capacitor 30 would be no different from what it would be later in the landing run. However, the added circuit 50 temporarily provides another discharge path in addition to that provided by the resistors 40 and 42 and transistors 34 and 36, so that, for the first few seconds, the modulator capacitor discharges faster than it does later on.

Discharge of the modulator capacitor upon the initial skid is through a diode 60 and resistor 62 into a grounded capacitor 64, with this circuit momentarily allowing the modulator capacitor 30 to discharge at a faster-than normal rate. A resistor 66 is purposely made of comparatively high value so that capacitor 64 cannot quickly discharge. Therefore, when capacitor 64 becomes charged to nearly the same voltage as the modulator capacitor 30, this capacitor 64 cannot repeatedly provide a similar discharge path.

The diode 60 prevents discharge of capacitor 64 through any path other than resistor 66. Resistor 66 is selected so as to allow capacitor 64 to slowly discharge and thus to be ready by the next time the antiskid system is required to operate; in other words, the next takeoff or landing.

The electrical values for the components will depend upon the voltage operating level and the system requirements but are easily computed by those skilled in the art. The results of aircraft landing utilizing the modified modulator circuit illustrated and described hereinabove resulted in shorter brake landing distances because of a more accurate initial computation of the coefficient of friction between the runway and the wheels being braked.

While in accordance with the patent statutes only one best known embodiment of the invention has been illustrated and

What we claim is:

1. In an antiskid braking system the combination of
a rotatable wheel
means to supply hydraulic braking pressure to the wheel,
valve means to adjustably restrict the hydraulic pressure actually applied to the wheel,
means to represent the wheel rotation as an electrical signal,
skid detector means to control the braking pressure to the wheel by supplying a control signal to the valve means, and
a modulation circuit acting in accordance with the control signal to adjust the valve means to a hydraulic pressure slightly lower than that which caused a skid upon returned braking operation after actuation of the valve means which is characterized by circuit means associated with the modulation circuit to allow the modulation circuit to respond more rapidly to the control signal during at least the first detection of a skid by the skid detector means so that true wheel loading conditions can be established before the modulation circuit begins to function at a normal predetermined rate.

2. A braking system according to claim 1 where the modulation circuit includes a first capacitor which is charged upon normal rotation of the wheel, and the circuit means associated with the modulation circuit includes a second capacitor arranged to be charged rapidly by the first discharge of the first capacitor, and to bleed off slowly thereafter to delay further discharges by said first capacitor.

3. A system according to claim 2 where the second capacitor is connected to the output side of the first capacitor through a one-way diode, and a large resistor connects the output of the second capacitor to ground.

4. A system according to claim 1 where the modulation circuit includes a variable resistor to provide a controlled discharge of the first capacitor to ground.